United States Patent
Xu

(10) Patent No.: US 11,253,412 B1
(45) Date of Patent: Feb. 22, 2022

(54) MEDICAL TRANSFER PAD AND PRODUCTION PROCESS THEREOF

(71) Applicant: KEASY (XIAMEN) TECHNOLOGY CO., LTD, Xiamen (CN)

(72) Inventor: Zhiyong Xu, Putian (CN)

(73) Assignee: KEASY (XIAMEN) TECHNOLOGY CO., LTD, Xiamen (CN)

( * ) Notice: Subject to any disclaimer, the term of this patent is extended or adjusted under 35 U.S.C. 154(b) by 0 days.

(21) Appl. No.: 17/367,435

(22) Filed: Jul. 5, 2021

(51) Int. Cl.
| | |
|---|---|
| *A61G 7/10* | (2006.01) |
| *B32B 5/26* | (2006.01) |
| *A61G 1/003* | (2006.01) |
| *A61G 1/048* | (2006.01) |
| *A61G 1/01* | (2006.01) |

(52) U.S. Cl.
CPC ............ *A61G 7/1023* (2013.01); *A61G 1/003* (2013.01); *A61G 1/01* (2013.01); *A61G 1/048* (2013.01); *A61G 7/1051* (2013.01); *B32B 5/26* (2013.01); *B32B 2255/02* (2013.01); *B32B 2255/26* (2013.01); *B32B 2262/0261* (2013.01); *B32B 2307/51* (2013.01); *B32B 2307/5825* (2013.01); *B32B 2307/73* (2013.01); *B32B 2307/744* (2013.01)

(58) Field of Classification Search
CPC .... A61G 7/1023; A61G 7/1051; A61G 1/003; A61G 1/01; A61G 1/048; B32B 5/26; B32B 2255/26; B32B 2307/73; B32B 2307/744

See application file for complete search history.

(56) References Cited

U.S. PATENT DOCUMENTS

| | | | | |
|---|---|---|---|---|
| 2003/0232556 | A1* | 12/2003 | Toro | B32B 27/12 442/286 |
| 2005/0204470 | A1* | 9/2005 | Main | B66C 1/18 5/81.1 T |
| 2009/0004452 | A1* | 1/2009 | Assink | A61G 1/01 428/220 |
| 2011/0119831 | A1* | 5/2011 | Rincon | A61G 1/013 5/627 |
| 2020/0324510 | A1* | 10/2020 | Yung | D04H 1/4374 |
| 2020/0383853 | A1* | 12/2020 | Ayres | A61F 13/36 |

\* cited by examiner

*Primary Examiner* — Jasper Saberi

(57) ABSTRACT

A medical transfer pad and a production process thereof including a transfer pad body, at least two square pockets arranged symmetrically up and down are disposed on a middle portion of the rear portion of the transfer pad body, and at least two tensile fabric webbing handles symmetrically spaced up and down are disposed on a rear portion of the transfer pad body. The transfer pad body includes a polymer nano-level columnar elastomer anti-skid layer, a first waterproof fiber cloth layer, a first waterproof fiber cloth layer, and a high-strength tear-resistant nylon webbing layer that are placed neatly from top to bottom and are stitched and reinforced by high-strength nylon thread. An upper surface of the first waterproof fiber cloth layer is sprayed with the polymer nano-level columnar elastomer anti-skid layer.

7 Claims, 4 Drawing Sheets

MEDICAL TRANSFER PAD AND PRODUCTION PROCESS THEREOF

TECHNICAL FIELD

The present disclosure relates to a field of medical care equipment, technology, and in particular to a medical transfer pad and a production process thereof.

BACKGROUND

At present, most medical transfer pads on the market are made of relatively smooth fabrics, so that anti-skid and waterproof functions of the medical transfer pads on the market are unsatisfactory. When a medical staff uses a medical transfer pad to move a patient, the medical transfer pad is easy separated from the patient's body. In addition, when the patient lies on the medical transfer pad and the medical staff helps the patient turn over or sit up, the medical transfer pad is also prone to be separated from the patient's body. Moreover, when the patient accidentally drips water onto the medical transfer pad, it is easy to wet the medical transfer pad. In summary, since the conventional medical transfer pads on the market do not have satisfactory anti-skid and waterproof functions, when the medical transfer pads are used in medical care processes, they may cause great troubles to the medical staffs and the patients.

Furthermore, a large area of the conventional medical transfer pads on the market are made of soft materials, such as cloth and webbing, so a middle portion of the medical transfer pad does not have good rigid support. In a process of moving patients using medical transfer pads, the medical staff sometimes need to provide rigid support to protect the patient's back due to medical care needs and avoid excessive bending of the patient's back, which may cause discomfort. However, the conventional medical transfer pads on the market cannot meet above-mentioned medical care needs due to lack of good rigid support in the middle portion of the medical transfer pad, which also causes great troubles to the medical staff and the patients.

Thus, it is necessary to develop a multifunctional medical transfer pad with good anti-skid function and waterproof function, and is able to adjust and increase the rigid support function according to medical care needs, and production process thereof to solve above-mentioned problems.

SUMMARY

In view of the above-mentioned problems in the prior art, technical problems to be solved by the present disclosure is to provide a multifunctional medical transfer pad and a production process of the medical transfer pad. The multifunctional medical transfer pad has good anti-skid function and waterproof function, and can be used according to medical care needs. Further, the medical transfer pad is adjustable to increase a rigid support function of a middle portion of the medical transfer pad according to the medical care needs.

The present disclosure provides a multifunctional medical transfer pad. The multifunctional medical transfer pad comprises a transfer pad body, square pockets, and a plurality of tensile fabric webbing handles. At least two tensile fabric webbing handles symmetrically spaced up and down are disposed on a rear portion of the transfer pad body. At least two square pockets arranged symmetrically up and down are disposed on a middle portion of the rear portion of the transfer pad body.

The transfer pad body comprises a polymer nano-level columnar elastomer anti-skid layer, a first waterproof fiber cloth layer, a second waterproof fiber cloth layer, and a high-strength tear-resistant nylon webbing layer. The first waterproof fiber cloth layer, the second waterproof fiber cloth layer, and the high-strength tear-resistant nylon webbing layer are placed neatly from top to bottom. The first waterproof fiber cloth layer, the second waterproof fiber cloth layer, and the high-strength tear-resistant nylon webbing layer are stitched and reinforced by high-strength nylon thread. An upper surface of the first waterproof fiber cloth layer is sprayed with the polymer nano-level columnar elastomer anti-skid layer.

Furthermore, a polymer thermoplastic anti-skid material is heated and melted at a high temperature to spray on the upper surface of the first waterproof fiber cloth layer and then cooled and solidified to form the polymer nano-level columnar elastomer anti-skid layer. A thickness of the polymer nano-level columnar elastomer anti-skid layer ranges from 0.3-0.5 mm.

Furthermore, both of the first waterproof fiber cloth layer and the second waterproof fiber cloth layer are made of waterproof high-density nylon fiber cloth. The waterproof high-density nylon fiber cloth is made of high-density nylon cloth in textile waterproofing agent through a padding process.

Furthermore, the high-strength tear-resistant nylon webbing layer is a high-strength tear-resistant nylon cloth braided by high-strength nylon filaments.

Furthermore, the multifunctional medical transfer pad further comprises a supporting plate matched with the square pockets. The supporting plate is rectangular. Two ends of the supporting plate are configured to be placed in the square pockets freely to provide a rigid support for a middle portion of the transfer pad body.

Furthermore, the tensile fabric webbing handles comprise first fabric webbing handles and second fabric webbing handles. The first fabric webbing handles are horizontally stitched and fixed on the rear portion of the transfer pad body. The second fabric webbing handles are vertically stitched and fixed on the rear portion of the transfer pad body. A first end of each second fabric webbing handle close to a corresponding first fabric webbing handle is stitched and fixedly connected with the corresponding first fabric webbing handle.

The present disclosure further provides a production process of the multifunctional medical transfer pad. The production process comprises following steps:

a waterproof process: making the waterproof high-density nylon fiber cloth by padding high-density nylon cloth in textile waterproofing agent; in a padding process, an amount of the textile waterproofing agent is 3%-6% of a weight of the high-density nylon fabric; after one dipping process and one rolling process, the waterproof high-density nylon fiber cloth with a waterproof function is formed by drying and shaping at a temperature ranging from 150~170° C.;

a cutting process: cutting the waterproof high-density nylon fiber fabric obtained to obtain a first waterproof fiber fabric layer and a second waterproof fiber fabric layer; cutting high-strength tear-resistant nylon cloth to obtain a high-strength tear-resistant nylon webbing layer, square pockets, and tensile fabric webbing handles;

a stitching process: placing the first waterproof fiber cloth layer, the second waterproof fiber cloth layer, and the high-strength tear-resistant nylon webbing layer neatly from top to bottom, stitching and reinforcing the first waterproof fiber cloth layer, the second waterproof fiber cloth layer, and the high-strength tear-resistant nylon webbing layer by high-strength nylon thread to form a semi-finished transfer pad body; stitching at least two tensile fabric webbing handles symmetrically spaced up and down on a rear portion of the semi-finished transfer pad body, then stitching at least two square pockets symmetrically spaced up and down on a middle portion of the rear portion of the semi-finished transfer pad body; and a spraying process: heating and melting a polymer thermoplastic anti-skid material at a high temperature by a heating device; spraying the melted polymer thermoplastic anti-skid material on an upper surface of the first waterproof fiber cloth layer by a spaying device; forming a polymer nano-level columnar elastomer anti-skid layer with a thickness ranging from 0.3-0.5 mm after cooling and solidifying.

The polymer nano-level columnar elastomer anti-skid layer on the upper surface of the multifunctional medical transfer pad of the present disclosure is formed with countless nano-sized polymer columnar elastomers with anti-skid function and adsorption function, so that the polymer nano-level columnar elastomer anti-skid layer has effects of adsorption and traction on an object placed on its surface, thereby achieving a good anti-skid effect. When a medical staff uses the multifunctional medical transfer pad to move a patient, the patient's body does not separate from the multifunctional medical transfer pad. In addition, when the patient lies on the multifunctional medical transfer pad, the medical staff can help the patient turn over or sit up, and the patient's body does not separate from the multifunctional medical transfer pad; thereby achieving purposes of anti-skid and safe and efficient transfer of the patient, increasing a comfort of the patient, and improving medical care efficiency of the medical staff.

The multifunctional medical transfer pad of the present disclosure comprise two layers of waterproof fiber cloth. When water is accidentally dropped onto the multifunctional medical transfer pad, it is not easy to wet the medical transfer pad, which is convenient for the medical staff to perform medical care.

The middle portion of the rear portion of the multifunctional medical transfer pad of the present disclosure is stitched with spare square pockets. When the middle portion of the multifunctional medical transfer pad needs rigid support, the two ends of the supporting plate are inserted into and placed in the square pockets. When the middle portion of the multifunctional medical transfer pad does not require rigid support, the supporting plate is taken out of the square pockets. In the medical process, when it is necessary to provide rigid support and protection to the patient's back, the medical staff adjust the supporting plate to increase the rigid support of the middle portion of the multifunctional medical transfer pad to achieve good rigid support and protection of the patient's back and avoid excessive bending of the patient's back which may cause discomfort.

DETAILED DESCRIPTION

Optional embodiments of the present disclosure will be described in detail with reference to the accompanying drawings.

Figure 1:
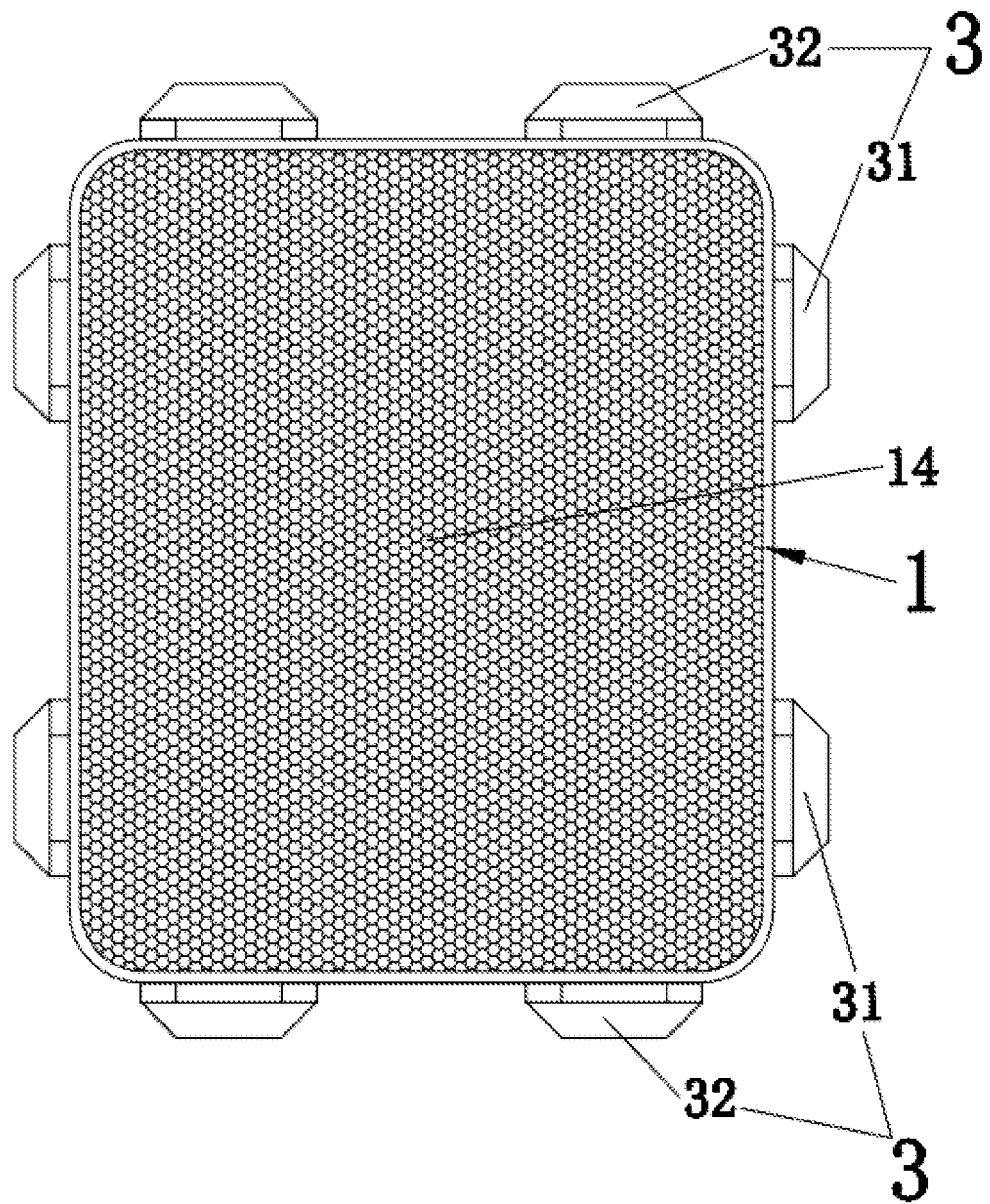
FIG. 1 is a front schematic diagram of a multifunctional medical transfer pad of the present disclosure.
Figure 2:
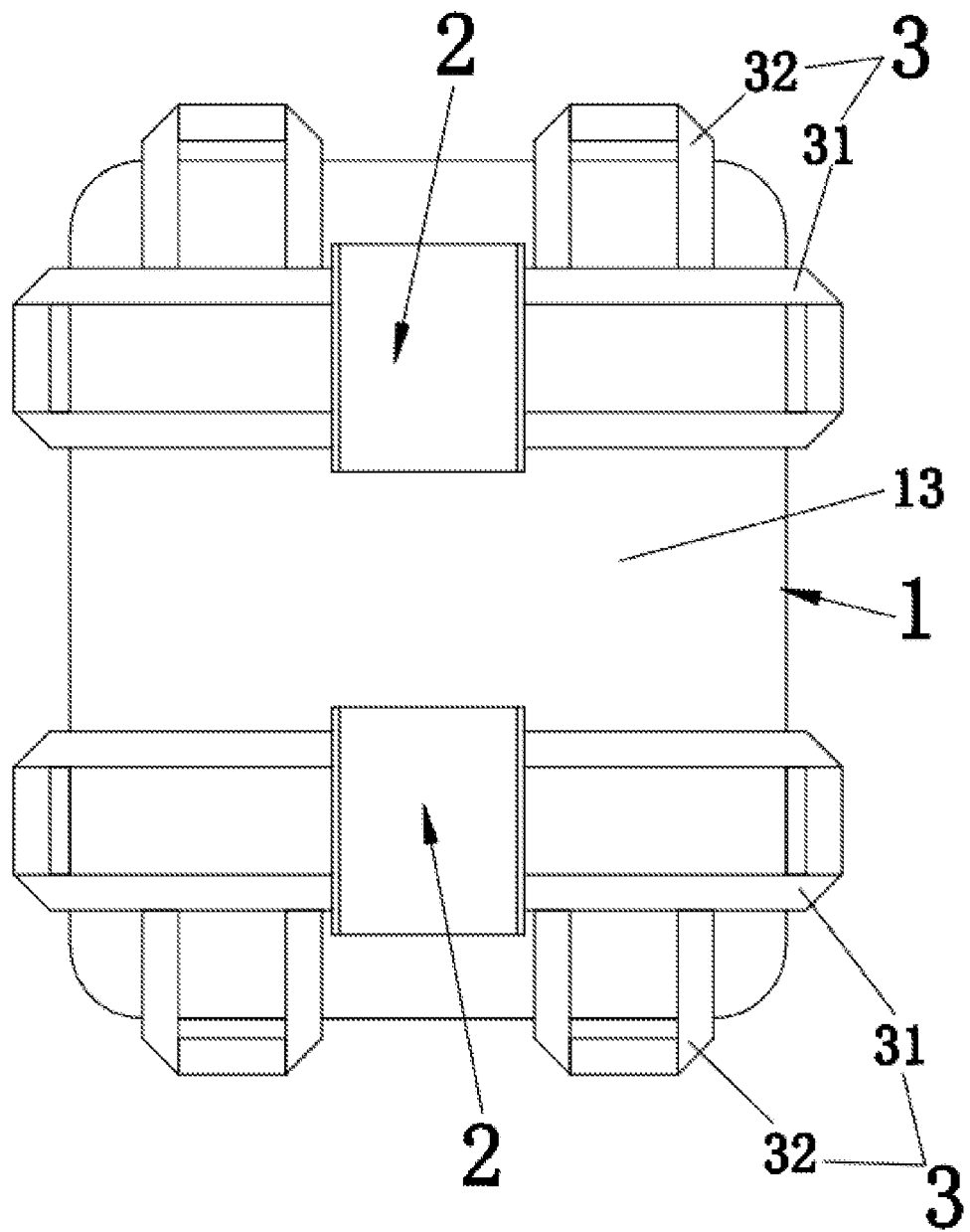
FIG. 2 is a rear schematic diagram of the multifunctional medical transfer pad of the present disclosure.
Figure 3:
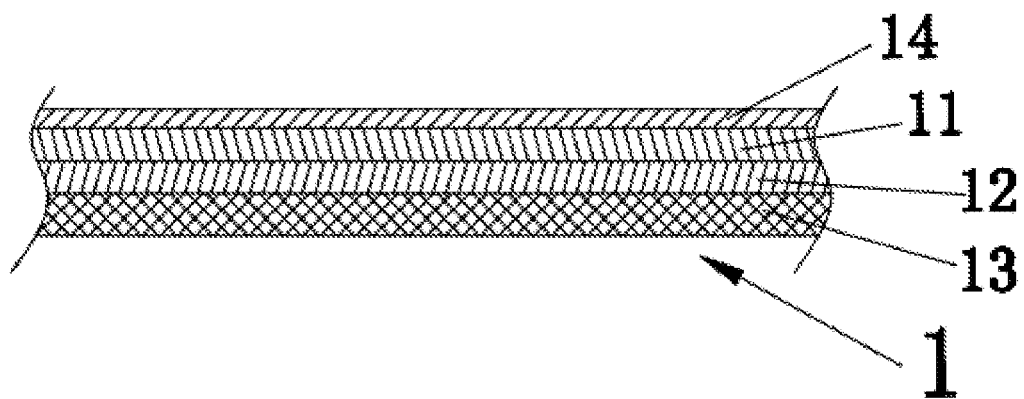
FIG. 3 is an exploded schematic diagram of a transfer pad body of the present disclosure.

As shown in FIGS. 1-3, the present disclosure provides a multifunctional medical transfer pad. The multifunctional medical transfer pad comprise a transfer pad body 1, square pockets 2, and a plurality of tensile fabric webbing handles 3. At least two tensile fabric webbing handles 3, symmetrically spaced up and down, are disposed on a rear portion of the transfer pad body. At least two square pockets 2, arranged symmetrically up and down, are disposed on a middle portion of the rear portion of the transfer pad body 1.

As shown in FIG. 3, the transfer pad body 1 comprises a polymer nano-level columnar elastomer anti-skid layer 14, a first waterproof fiber cloth layer 11, a second waterproof fiber cloth layer 12, and a high-strength tear-resistant nylon webbing layer 13. The first waterproof fiber cloth layer 11, the second waterproof fiber cloth layer 12, and the high-strength tear-resistant nylon webbing layer 13 are placed neatly from top to bottom. The first waterproof fiber cloth layer 11, the second waterproof fiber cloth layer 12, and the high-strength tear-resistant nylon webbing layer 13 are stitched and reinforced by high-strength nylon thread. An upper surface of the first waterproof fiber cloth layer 11 is sprayed with the polymer nano-level columnar elastomer anti-skid layer 14.

A polymer thermoplastic anti-skid material is heated and melted at a high temperature to spray on the upper surface of the first waterproof fiber cloth layer 11 and then cooled and solidified to form the polymer nano-level columnar elastomer anti-skid layer 14. A thickness of the polymer nano-level columnar elastomer anti-skid layer 14 ranges from 0.3-0.5 mm. Both of the first waterproof fiber cloth layer 11 and the second waterproof fiber cloth layer 12 are made of waterproof high-density nylon fiber cloth. The waterproof high-density nylon fiber cloth is made of high-density nylon cloth in textile waterproofing agent through a padding process. The high-strength tear-resistant nylon webbing layer 13 is a high-strength tear-resistant nylon cloth braided by high-strength nylon filaments.

Figure 4:
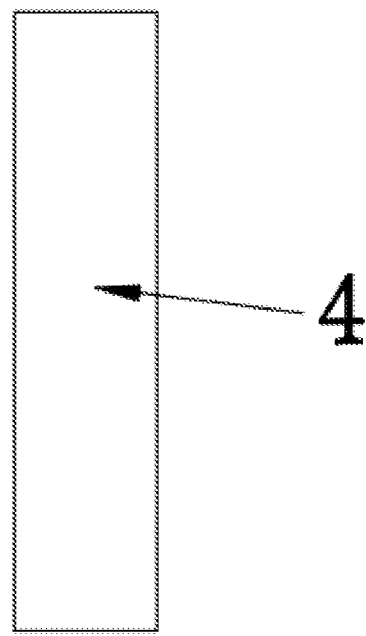
FIG. 4 is a front schematic diagram of a supporting plate of the present disclosure.
Figure 5:
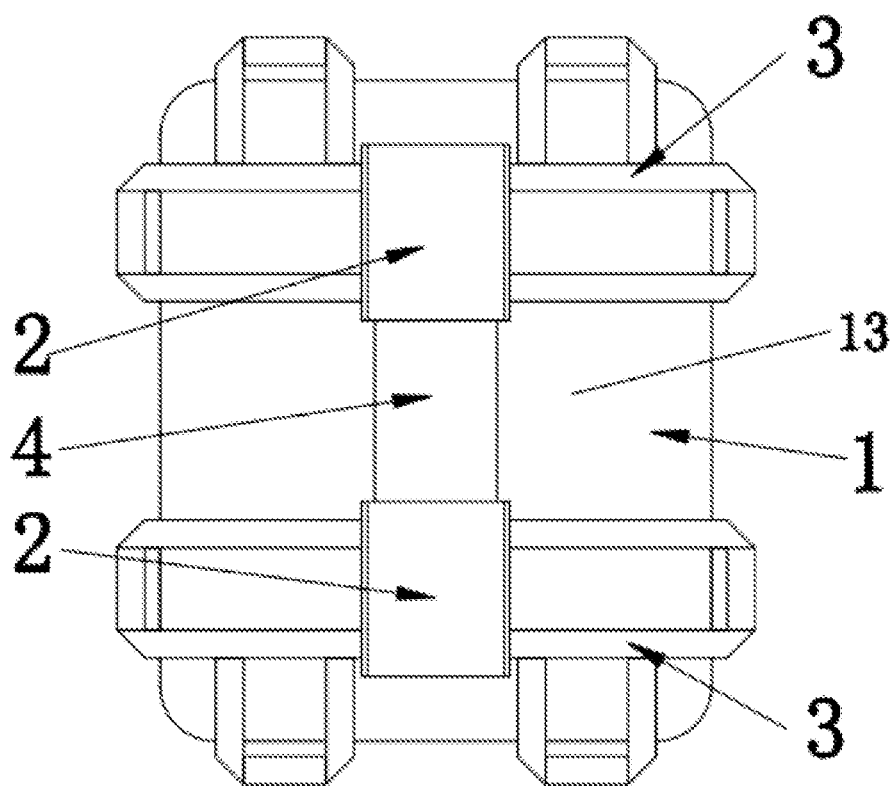
FIG. 5 is a structural schematic diagram of the multifunctional medical transfer pad of the present disclosure where the supporting plate is placed in square pockets.

As shown in FIGS. 4 and 5, the multifunctional medical transfer pad further comprises a supporting plate 4 matched with the square pockets 2, The supporting plate 4 is rectangular. Two ends of the supporting plate 4 are configured to be placed in the square pockets 2 freely to provide a rigid support for a middle portion of the transfer pad body. When the middle portion of the multifunctional medical transfer pad needs rigid support, the two ends of the supporting plate 4 are inserted into and placed in the square pockets 2. When the middle portion of the multifunctional medical transfer pad does not require rigid support, the supporting plate 4 is taken out of the square pockets 2.

As shown in FIGS. 1, 2, and 5, the tensile fabric webbing handles 3 comprise first fabric webbing handles 31 and second fabric webbing handles 32. The first fabric webbing handles 31 are horizontally stitched and fixed on the rear portion of the transfer pad body. The second fabric webbing handles 32 are vertically stitched and fixed on the rear portion of the transfer pad body. A first end of each second fabric webbing handle 32 close to a corresponding first fabric webbing handle 31 is stitched and fixedly connected with the corresponding first fabric webbing handle 31.

A production process of the multifunctional medical transfer pad described, comprises following steps:

a waterproof process: making the waterproof high-density nylon fiber cloth by padding high-density nylon cloth in textile waterproofing agent; in a padding process, an amount of the textile waterproofing agent is 3-6% of a weight of the high-density nylon fabric; after one dipping process and one rolling process, the waterproof high-density nylon fiber cloth with a waterproof function is formed by drying and shaping at a temperature ranging from 150-170° C.;

a cutting process: cutting the waterproof high-density nylon fiber fabric obtained to obtain a first waterproof fiber fabric layer and a second waterproof fiber fabric layer; cutting high-strength tear-resistant nylon cloth to obtain a high-strength tear-resistant nylon webbing layer, square pockets, and tensile fabric webbing handles;

a stitching process: placing the first waterproof fiber cloth layer, the second waterproof fiber cloth layer, and the high-strength tear-resistant nylon webbing layer neatly from top to bottom, stitching and reinforcing the first waterproof fiber cloth layer, the second waterproof fiber cloth layer, and the high-strength tear-resistant nylon webbing layer by high-strength nylon thread to form a semi-finished transfer pad body; stitching at least two tensile fabric webbing handles symmetrically spaced up and down on a rear portion of the semi-finished transfer pad body, then stitching at least two square pockets symmetrically spaced up and down on a middle portion of the rear portion of the semi-finished transfer pad body; and a spraying process: heating and melting a polymer thermoplastic anti-skid material at a high temperature by a heating device; spraying the melted polymer thermoplastic anti-skid material on an upper surface of the first waterproof fiber cloth layer by a spaying device; forming a polymer nano-level columnar elastomer anti-skid layer with a thickness ranging from 0.3-0.5 mm after cooling and solidifying.

The polymer nano-level columnar elastomer anti-skid layer on the upper surface of the multifunctional medical transfer pad of the present disclosure is formed with countless nano-sized polymer columnar elastomers with anti-skid function and adsorption function, so that the polymer nano-level columnar elastomer anti-skid layer has effects of adsorption and traction on an object placed on its surface, thereby achieving a good anti-skid effect. When a medical staff uses the multifunctional medical transfer pad to move a patient, the patient's body does not separate from the multifunctional medical transfer pad. In addition, when the patient lies on the multifunctional medical transfer pad, the medical staff can help the patient turn over or sit up, and the patient's body does not separate from the multifunctional medical transfer pad; thereby achieving purposes of anti-skid and safe and efficient transfer of the patient, increasing a comfort of the patient, and improving medical care efficiency of the medical staff.

The medical transfer pad of the present disclosure comprises two layers of waterproof fiber cloth. When water is accidentally dropped onto the multifunctional medical transfer pad, it is not easy to wet the multifunctional medical transfer pad, which is convenient for the medical staff to perform medical care, The middle portion of the rear portion of the multifunctional medical transfer pad of the present disclosure is stitched with spare square pockets. When the middle portion of the multifunctional medical transfer pad needs rigid support, the two ends of the supporting plate are inserted into and placed in the square pockets. When the middle portion of the multifunctional medical transfer pad does not require rigid support, the supporting plate is taken out of the square pockets. In the medical process, when it is necessary to provide rigid support and protection to the patient's back, the medical staff adjust the supporting plate to increase the rigid support of the middle portion of the multifunctional medical transfer pad to achieve good rigid support and protection of the patient's back and avoid excessive bending of the patient's back which may cause discomfort, The above are only optional specific embodiments of the present disclosure, and the protection scope of the present disclosure is not limited thereto. Any modification, equivalent replacement, improvement, etc, made within the spirit and principle of the present disclosure shall be fall within the protection scope of the present disclosure.

What is claimed is:

1. A medical transfer pad, comprising: a transfer pad body; square pockets; and a plurality of tensile fabric webbing handles; wherein at least two tensile fabric webbing handles are symmetrically spaced up and down and are disposed on a rear portion of the transfer pad body; at least two square pockets are arranged symmetrically up and down and are disposed on a middle portion of the rear portion of the transfer pad body; wherein the transfer pad body comprises a polymer nano-level columnar elastomer anti-skid layer, a first waterproof fiber cloth layer, a second waterproof fiber cloth layer, and a high-strength tear-resistant nylon webbing layer; the first waterproof fiber cloth layer, the second waterproof fiber cloth layer, and the high-strength tear-resistant nylon webbing layer are placed neatly from top to bottom; the first waterproof fiber cloth layer, the second waterproof fiber cloth layer, and the high-strength tear-resistant nylon webbing layer are stitched and reinforced by high-strength nylon thread; and an upper surface of the first waterproof fiber cloth layer is sprayed with the polymer nano-level columnar elastomer anti-skid layer.

2. The medical transfer pad according to claim 1, wherein a polymer thermoplastic anti-skid material is heated and melted at a high temperature to spray on the upper surface of the first waterproof fiber cloth layer and then cooled and solidified to form the polymer nano-level columnar elastomer anti-skid layer; and a thickness of the polymer nano-level columnar elastomer anti-skid layer ranges from 0.3-0.5 mm.

3. The medical transfer pad according to claim 1, wherein both of the first waterproof fiber cloth layer and the second waterproof fiber cloth layer are made of waterproof high-density nylon fiber cloth; wherein the waterproof high-density nylon fiber cloth is made by padding high-density nylon cloth in textile waterproofing agent.

4. The medical transfer pad according to claim 1, wherein the high-strength tear-resistant nylon webbing layer is a high-strength tear-resistant nylon cloth braided by high-strength nylon filaments.

5. The medical transfer pad according to claim 1, wherein the medical transfer pad further comprises a supporting plate matched with the square pockets; the supporting plate is rectangular; two ends of the supporting plate are configured to be placed in the square pockets freely to provide a rigid support for a middle portion of the transfer pad body.

6. The medical transfer pad according to claim 1, wherein the tensile fabric webbing handles comprise first fabric webbing handles and second fabric webbing handles; the first fabric webbing handles are horizontally stitched and fixed on the rear portion of the transfer pad body; the second fabric webbing handles are vertically stitched and fixed on the rear portion of the transfer pad body; a first end of each second fabric webbing handle close to a corresponding first fabric webbing handle is stitched and fixedly connected with the corresponding first fabric webbing handle.

7. A production process of the medical transfer pad of claim 1, comprising the following steps: a waterproof process: making a waterproof high-density nylon fiber cloth by padding high-density nylon cloth in textile waterproofing agent; wherein in a padding process, an amount of the textile waterproofing agent is 3-6% of a weight of the high-density nylon fiber cloth; after one dipping process and one rolling process, the waterproof high-density nylon fiber cloth with a waterproof function is formed by drying and shaping at a temperature ranging from 150-170° C.; a cutting process: cutting the waterproof high-density nylon fiber cloth obtained to obtain the first waterproof fiber cloth layer and the second waterproof fiber cloth layer; cutting a high-strength tear-resistant nylon cloth to obtain a high-strength tear-resistant nylon webbing layer, square pockets, and tensile fabric webbing handles; a stitching process: placing the first waterproof fiber cloth layer, the second waterproof fiber cloth layer, and the high-strength tear-resistant nylon webbing layer neatly from top to bottom, stitching and reinforcing the first waterproof fiber cloth layer, the second waterproof fiber cloth layer, and the high-strength tear-resistant nylon webbing layer by high-strength nylon thread to form a semi-finished transfer pad body; stitching at least two tensile fabric webbing handles symmetrically spaced up and down on a rear portion of the semi-finished transfer pad body, then stitching at least two square pockets symmetrically spaced up and down on a middle portion of the rear portion of the semi-finished transfer pad body; and a spraying process: heating and melting a polymer thermoplastic anti-skid material at a high temperature by a heating device; spraying the melted polymer thermoplastic anti-skid material on an upper surface of the first waterproof fiber cloth layer by a spaying device; forming a polymer nano-level columnar elastomer anti-skid layer with a thickness ranging from 0.3-0.5 mm after cooling and solidifying.

\* \* \* \* \*